United States Patent
Prasad et al.

(10) Patent No.: US 11,107,091 B2
(45) Date of Patent: Aug. 31, 2021

(54) GESTURE BASED IN-STORE PRODUCT FEEDBACK SYSTEM

(71) Applicant: Toshiba Global Commerce Solutions Holdings Corporation, Tokyo (JP)

(72) Inventors: Kavita Prasad, Bangalore (IN); Megha Sakrikar, Bangalore (IN); Vibhor Goel, Basavanagar (IN); Shruti Grover, Basavanagar (IN)

(73) Assignee: Toshiba Global Commerce Solutions, Tokyo (JP)

( * ) Notice: Subject to any disclaimer, the term of this patent is extended or adjusted under 35 U.S.C. 154(b) by 893 days.

(21) Appl. No.: 14/675,053

(22) Filed: Mar. 31, 2015

(65) Prior Publication Data
US 2016/0110727 A1    Apr. 21, 2016

(30) Foreign Application Priority Data
Oct. 15, 2014    (IN) ........................... 5160/CHE/2014

(51) Int. Cl.
*G06Q 30/02* (2012.01)
*G06K 9/00* (2006.01)

(52) U.S. Cl.
CPC ..... *G06Q 30/0201* (2013.01); *G06K 9/00355* (2013.01); *G06K 9/00604* (2013.01)

(58) Field of Classification Search
None
See application file for complete search history.

(56) References Cited

U.S. PATENT DOCUMENTS

| | | | |
|---|---|---|---|
| 2006/0010028 A1* | 1/2006 | Sorensen | G06Q 30/0201 705/7.34 |
| 2007/0293978 A1* | 12/2007 | Wurman | G05B 19/4189 700/213 |

(Continued)

FOREIGN PATENT DOCUMENTS

| | | | | |
|---|---|---|---|---|
| WO | WO 2009050529 A2 * | 4/2009 | | G06Q 30/02 |
| WO | WO-2009050529 A2 * | 4/2009 | | G06Q 30/02 |
| WO | 2013093638 A2 | 6/2013 | | |

OTHER PUBLICATIONS

Drell, Lauren, Shopping Goes High-Tech With Retail-Based Gesture Recognition, Marketing Insights, Jun. 2014, <https://www.ama.org/publications/eNewsletters/MarketingInsightsNewsletter/Pages/shopping-goes-high-tech.aspx>.

(Continued)

*Primary Examiner* — Akosua Kyereme-Tuah
(74) *Attorney, Agent, or Firm* — Patterson + Sheridan, LLP (57) ABSTRACT

As disclosed herein, an in-store feedback system permits shoppers to provide positive or negative feedback for a particular item using gestures or spoken language. To do so, the feedback system includes a gaze tracking module that identifies what product a shopper is currently focusing on. For example, a rack, which may contain multiple rows of shelves, is divided into a grid that includes a plurality of cells. By determining what cell the shopper is currently staring at, the gaze tracking system can identify a particular item by knowing which items are placed in which cell. The in-store feedback system may also include a gesture recognition system that identifies and decodes a gesture made by the shopper. For example, a thumbs up is positive feedback but a thumbs down is negative feedback. By recognizing the gesture, the gesture recognition system assigns positive or negative feedback to the item.

20 Claims, 5 Drawing Sheets

(56) References Cited

U.S. PATENT DOCUMENTS

| | | | |
|---|---|---|---|
| 2010/0078401 A1* | 4/2010 | Vulpitta | A47F 5/0018 211/153 |
| 2010/0149090 A1 | 6/2010 | Morris et al. | |
| 2010/0174586 A1 | 7/2010 | Berg, Jr. et al. | |
| 2012/0233003 A1 | 9/2012 | Calman et al. | |
| 2012/0235903 A1 | 9/2012 | Im | |
| 2012/0257035 A1 | 10/2012 | Larsen | |
| 2013/0008947 A1 | 1/2013 | Aidasani et al. | |
| 2013/0050118 A1 | 2/2013 | Kjelsbak et al. | |
| 2013/0218721 A1 | 8/2013 | Borhan et al. | |
| 2013/0223673 A1* | 8/2013 | Davis | G06Q 30/00 382/100 |
| 2013/0265223 A1 | 10/2013 | Khosravy et al. | |
| 2013/0283208 A1 | 10/2013 | Bychkov et al. | |
| 2014/0043234 A1* | 2/2014 | Eilat | G06F 3/017 345/158 |
| 2014/0214628 A1* | 7/2014 | Argue | G06Q 30/0601 705/27.1 |
| 2014/0282277 A1* | 9/2014 | Suhl | G06F 16/9535 715/863 |
| 2014/0365333 A1* | 12/2014 | Hurewitz | G06Q 30/0643 705/26.9 |
| 2015/0012396 A1 | 1/2015 | Puerini et al. | |
| 2015/0019391 A1 | 1/2015 | Kumar et al. | |
| 2015/0029339 A1* | 1/2015 | Kobres | H04N 7/181 348/150 |

OTHER PUBLICATIONS

Löchtefeld, Markus, Tracking Pointing Gestures to Support Sales Conversations, Proceedings of the 28th International Conference on Human Factors in Computing Systems, Apr. 2010, pp. 1-4, ACM, New York, United States.

Fawkes, Piers, Future of Retail: Gesture-Based Browsing, Aug. 4, 2011, PSFK, New York, United States, <http://www.psfk.com/2011/08/future-of-retail-gesture-based-browsing.html>.

Kowatsch, Tobias et al., In-store consumer behavior: How mobile recommendation agents influence usage intentions, product purchases, and store preferences, Computers in Human Behavior, vol. 26, Issue 4, pp. 697-704, Jul. 2010, Elsevier Science Publishers, Amsterdam, The Netherlands.

* cited by examiner

GESTURE BASED IN-STORE PRODUCT FEEDBACK SYSTEM

BACKGROUND

This application is a non-provisional of co-pending IN Provisional Application 5160/CHE/2014, filed Oct. 15, 2014. The aforementioned patent application is herein incorporated by reference in its entirety.

Aspects disclosed herein relate to receiving feedback from shoppers in stores, and more specifically, to using gestures by the shopper to assign positive or negative feedback to items.

Online shopping provides several mechanisms for shoppers to collaborate, network, and determine popular and fast selling product information gathered through customer feedback. However, in-store shopping (i.e., shopping in physical stores rather than shopping using the Internet) lacks tools for enabling the shopper to determine which products are fast moving or are bestsellers (absent using an Internet connected device such as a smart phone). Because the shopper may be unable to access feedback provided by other shoppers or determine the most popular or best selling items, the shopper may be less satisfied with her purchases than she would otherwise be if she could access this information. Moreover, the shopper may make decisions slower than she would if she could access feedback provided by other customers.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The embodiments described herein include an in-store feedback system that permits shoppers to provide positive or negative feedback for a particular item using gestures or spoken language. This feedback system gathers perspectives of in-store shoppers on which items are favored or recommended. To do so, the feedback system includes a gaze tracking system that identifies what product a shopper is currently focusing on. For example, a rack, which may contain multiple rows of shelves, is divided into a grid that includes plurality of cells. By determining what cell the shopper is currently staring at, the gaze tracking system can identify a particular item by knowing which items are placed in which cell. The in-store feedback system may also include a gesture recognition system that identifies and decodes a gesture made by the shopper. For example, if the shopper likes the product she is currently gazing at, the shopper makes a thumbs up, but if not, she makes a thumbs down. By recognizing a thumbs up or thumbs down, the gesture recognition system assigns positive or negative feedback to the item which is collected in a database.

The feedback system also provides techniques for a shopper to retrieve feedback provided by other shoppers. The gaze tracking system may identify a particular item by determining which cell the shopper is currently viewing. If the shopper desires to learn what other shoppers thought of this item, the shopper makes a predefined gesture (e.g., raising an index finger) which the gesture recognition system identifies as an indicator to provide the stored feedback to the shopper. The feedback system may include an output device such as a display device or audio device that informs the shopper of the positive and/or negative feedback corresponding to the item. For example, the display device may inform the shopper that 12 of the 20 shoppers who reviewed this item liked it. In addition to providing the feedback provided by other shoppers, the feedback system may also provide information such as the popularity of the item relative to other similar products, trends associated with the product (whether it is increasing or decreasing in popularity), and the like. In this manner, the feedback system can be used in a brick and mortar store to collect, store, and output shopper feedback regarding a particular item or groups of items.

Figure 1:
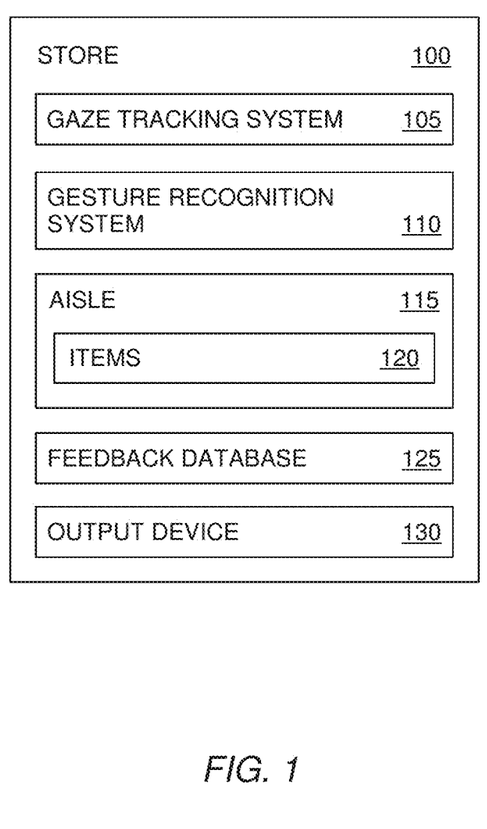
FIG. 1 is a block diagram of a store that receives feedback from a shopper for one or more items, according to one embodiment described herein.

FIG. 1 is a block diagram of a store 100 that receives feedback from shopper for a particular item 120, according to one embodiment described herein. Although the term "shopper" is used to identify a person who provides (and receives) feedback regarding a particular item in the store 100, the shopper does not need to actually purchase an item 120 while in the store 100. For example, a shopper could provide her opinion about one or more items 120 in the store 100 without ever purchasing any item 120. Moreover, the store 100 may be a brick or mortar store but is not limited to such. For example, the store 100 may be a mobile store such as a trailer or RV or an open air market.

The store 100 includes a gaze tracking system 105, gesture recognition system 110, aisle 115, feedback database 125, and output device 130. The gaze tracking system 105 may include one or more sensors and a tracking application for determining a direction that a shopper is gazing. For example, the sensors may capture image data that includes the eyes of the shopper. Based on the captured images, the tracking application may determine the direction the shopper is gazing. The present disclosure is not limited to particular technique of eye, gaze or face tracking, but can be used with any technique that is suitable for determining a direction or a region a shopper is gazing.

The gesture recognition system 110 may include one or more sensors and a gesture application for processing the data captured by the sensors. For example, the sensors may capture image data that includes the hands of a shopper. By processing the captured images, the gesture application determines whether the shopper is making a predefined gesture. If so, the gestures application performs an action corresponding to the gesture. For example, if the shopper is making a thumbs up, the gesture application may inform the gaze tracking system 105 that the shopper is giving positive feedback. In response, the gaze tracking system 105 identifies the item the shopper is currently viewing and assigns the positive feedback to that item. The gaze tracking system 105 may store the feedback in the feedback database 125.

In this example, store 100 includes one or more aisles 115 used to display items 120. The aisles 115 may include walkways or paths for the shopper. The items 120 may be displayed on one or both sides of these walkways. The items 120 may be arranged on racks with multiple shelves, stacked on top of each other, or, in the case of larger items, may be freestanding. In other arrangements, instead of being located in aisles 115, the items 120 may be located on tables, counters, display kiosks, and the like which may not have a defined walkway or path. Regardless of the particular arrangement, the location of the items 120 may be divided into a grid that includes a plurality of cells. In one example, each cell corresponds to a particular item or type (e.g., brand) of item. For instance, one cell may include only one flavor of chips made by multiple manufactures or brands—e.g., salt and vinegar chips made by Company A, Company B, and Company C. Or a cell may include only the chips made by one brand or manufacture—e.g., salt and vinegar chips, sour cream and onion chips, and cheesy chips that are all made by Company A. Or a cell may include multiple different products made by the same company—e.g., chips, cheese puffs, and popcorn that are all made by Company A. Alternatively, a cell may include only a single product made by a particular brand or company—e.g., salt and vinegar chips made by Company A.

Regardless of the different ways the items 120 may be divided into the cells, these assignments are provided to the gaze tracking system 105 so this system 105 can identify what item 120 (or items 120) the shopper is currently gazing at by determining which cell the shopper is viewing. Depending on the granularity of the system (e.g., how many items 120 or types of items are in each of the cells), the feedback system can store shopper feedback for the particular item 120 or items 120 in each cell. For example, if a first cell includes only chips with the same flavor (which may be made by multiple companies) and a second cell includes only chips with a different flavor, shoppers can use the gaze tracking system 105 and gesture recognition system 110 to indicate which flavor they prefer. Alternatively, if the first cell includes only chips from Company A (which may include different flavors) while the second cell includes only chips from Company B, the shoppers can use the gesture recognition system 110 to indicate which brand of chips they prefer. In this manner, the type of feedback provided by the shoppers may vary depending on whether the items 120 within each of the cells are the same (e.g., the same flavor and/or made by the same company) or different. Although flavor of chips and brand names are provided as an example, the items 120 may be distinguished by other characteristics such as cuts of meat, package size, package shape, weight of the item 120, and the like. By using the different characteristics to divide the items 120 into different cells, the shoppers can identify what characteristics they prefer.

As mentioned above, the preferences of the shoppers are stored in the feedback database 125. The gaze tracking system 105 and gesture recognition system 110 may then retrieve the stored preferences from the feedback database 125 when prompted by a shopper. For example, the gesture recognition system 110 may determine that a shopper has made a predefined gesture (e.g., pointing her index finger vertically) that indicates the shopper would like to know the opinions of other shoppers regarding an item or items 120. The gaze tracking system 105 identifies the item or items 120 the shopper is currently gazing at. For example, if the shopper is staring at cell that contains a specific flavor of chips made by Company A, the output device 130 may display a message that is based on the positive or negative feedback provided by other shoppers. For example, the message may state that the chips are less preferred than the same flavor of chips made by Company B, or that 70% of the shoppers who reviewed the chips gave positive feedback. Alternatively, if the shopper is gazing at a cell that includes the same flavor of chips (which may be made by different companies), the message may state that that particular flavor is preferred by only 30% of shoppers, or indicate to the shopper the flavor of chips that was most preferred by other shoppers.

In one example, the output device 130 may also provide the shopper with other information about the items she is gazing at such as whether there is a sale, how many units of the item are sold in a day, any trends associated with the items, and the like which may be derived by other means besides relying on feedback provided by other shoppers.

The output device 130 may be a display device (e.g., display screen or monitor), an audio device (speaker), or some combination of both. For example, the output device 130 may be a display screen that displays the percentage of shoppers that gave positive feedback for the items, or the device 130 may be a speaker that outputs the percentage of shoppers who liked the item. In another example, the device 130 may output video or audio testimonials from other shoppers regarding the product.

Figure 2:
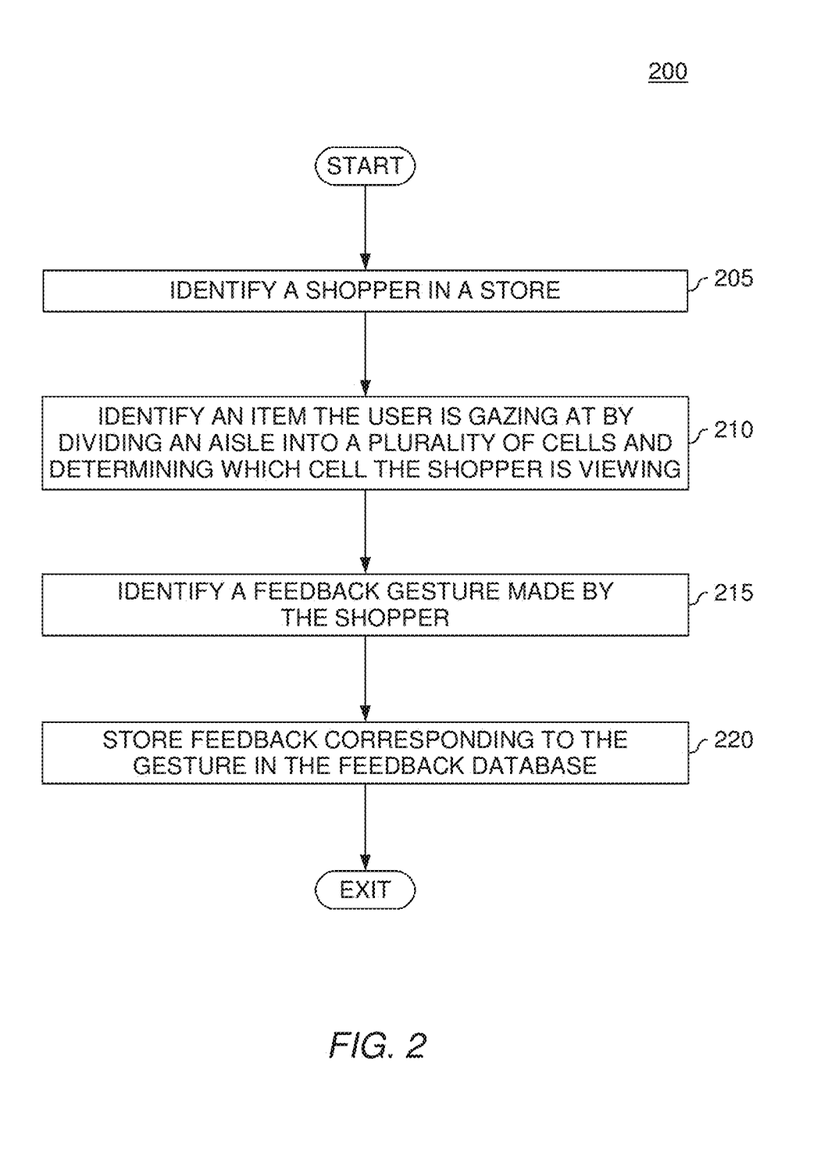
FIG. 2 is a method of using gestures to provide feedback for one or more items, according to embodiments described herein.

FIG. 2 is a method 200 of using gestures to assign feedback to an item or items, according to embodiments described herein. At block 205, the feedback system identifies a shopper in a store. The feedback system may use biometric information such as facial recognition, finger printing, etc, to uniquely identify the shopper. In one example, the identified shopper is matched to a loyalty program for the store. The loyalty program may be used to incentivize the shopper to provide feedback by rewarding the shopper with loyalty benefits. For example, if the shopper provides feedback for five or more items while visiting the store, the loyalty program may give the shopper a reward which she can use to reduce the price of a purchase made in the store. The reward may be a coupon for a specific item, a discount on her total purchase, points that can be redeemed, and the like.

Furthermore, by identifying the shopper, other shoppers can follow the feedback given by a specific shopper. For example, if Shopper A highly values the opinion of Shopper B, the feedback system can provide Shopper A with a list of the items that received positive feedback from Shopper B. In this manner, Shopper A can follow the recommendations of Shopper B. Moreover, the store may publish the qualifications of one or more shoppers so that other shoppers can determine if they would like to follow the advice of a particular shopper. For example, when providing the feedback, the feedback system may indicate whether a shopper that reviewed the product was a chef, food critic, or someone who purchases food for a restaurant, which may help the shopper decide whether to purchase the item.

In one example, the rewards are affected by the feedback given by the shopper. For example, if the feedback provided by the shopper results in an increase of sale of an item, the loyalty program may increase the reward to the shopper. Because the feedback may result in more shoppers purchasing a more expensive item, the loyalty program may increase the rewards to the shoppers who reviewed that item. To prevent abuse, however, the loyalty program may require that the increase in sales be maintained over a predefined period of time to ensure the shopper is honestly rating the item because the item is a superior product rather than giving positive feedback only because the item is more expensive.

In one example, the loyalty program may identify a shopper that gives too much feedback during a predefined time period (also referred to as spamming). For example, if the shopper exceeds a predefined threshold of reviews in one day, the loyalty program may determine that the feedback is not genuine (e.g., the shopper is providing the reviews only for the rewards) and disregard the feedback. Similarly, the loyalty program may disregard the feedback if the time between two different reviews is too short which may indicate the shopper is giving random or questionable feedback. Thus, by identifying the shopper, the loyalty program can track the feedback given by the shopper and prevent spamming.

Not only does identifying the shopper permit the feedback system to link the shopper to the loyalty program, the shopper's identity may also be used to provide targeted rewards or advertisements to the shopper based on the category or type of products she reviews. For instance, if the shopper primarily provides feedback for baby products, the reward given to the shopper may be for a baby product she reviewed (or a similar product)—e.g., if the shopper gave a negative review for one brand of diapers, the loyalty program may offer her a coupon for a different diaper brand.

At block 210, the feedback system identifies an item or items the shopper is currently gazing at. To do so, the feedback system may include the gaze tracking system discussed above that determines in what direction or what region the shopper is gazing at. In one example, the portion of the aisles that hold the items is divided into a grid with a plurality of cells. The gaze tracking system determines what cell is currently being looked at by the shopper. By knowing what item (or items) are in the cell, the gaze tracking system is able to identify the item or items the shopper is looking at.

At block 215, the feedback system identifies a feedback gesture made by the shopper. To do so, the feedback system may include the gesture recognition system discussed above that determines whether the shopper has made a predefined feedback gesture indicating that the shopper is providing feedback regarding the item she is currently gazing at. The predefined may be any gesture that can be recognized by a gesture recognition algorithm. In one example, the shopper uses different gestures to provide different feedback—e.g., a thumbs up means the shopper likes the item, while a thumbs down means the shopper does not.

Moreover, different gestures may give different weights of feedback. For example, if the shopper gives a thumbs down and holds her hand in place, this may correspond to disliking the product, but if she gives a thumbs down while simultaneously moving her hand down, this gesture may correspond to strongly disliking the item. Similarly, by giving a thumbs up and moving her hand upward in parallel, the shopper is conveying that she strongly likes the item. In another example, the shopper may review the item using her fingers where one finger means one star, two fingers mean two stars, and the like. Moreover, instead of giving positive or negative feedback, the gesture recognition system may recognize predefined gestures for providing neutral feedback (neither liked nor disliked the item) or indicating the shopper has tried the item but has not yet formulated an opinion. Additionally, there may be gestures for indicating that the value of the product relative to its cost. For example, a shopper may like two different types of laundry detergent, but because one is cheaper than the other, she may assign a greater value to the cheaper detergent.

At block 220, the feedback system stores the feedback corresponding to the identified gesture in the feedback database. In one example, the feedback database includes all the feedback provided by the shoppers in a particular store. The feedback database may be shared by multiple stores (e.g., different stores of the same supermarket chain) in which case the feedback database may combine the shopper feedback from the multiple stores. Thus, if multiple stores sell the same item, the feedback provided by shoppers at all the stores may be combined for the item. Moreover, different companies (e.g., different supermarket or retail chains) may collaborate by sharing the same feedback database in order to benefit from feedback given by shoppers when in the stores of other companies. For example, if Company A sells the same item in its stores as Company B, the feedback provided by shoppers in the stores of Company B can be accessed and used by shoppers in the stores of Company A.

In another example, the feedback provided by the shoppers may be shared on cross channel media. For example, the feedback gathered using method 200 may be loaded on online websites, mobile smart phone apps, and the like so that shoppers can access the feedback using a personal computing device whether they are in the store or outside the store. Likewise, feedback provided by online shoppers may be combined with the feedback stored in the database. In one example, the feedback received from different sources (e.g., online versus in-store) may be tracked and categorized. For example, a shopper may be more interested in feedback provided by in-store shoppers since she may believe they better represent her taste than online shoppers who may be spread across the country.

Figure 3:
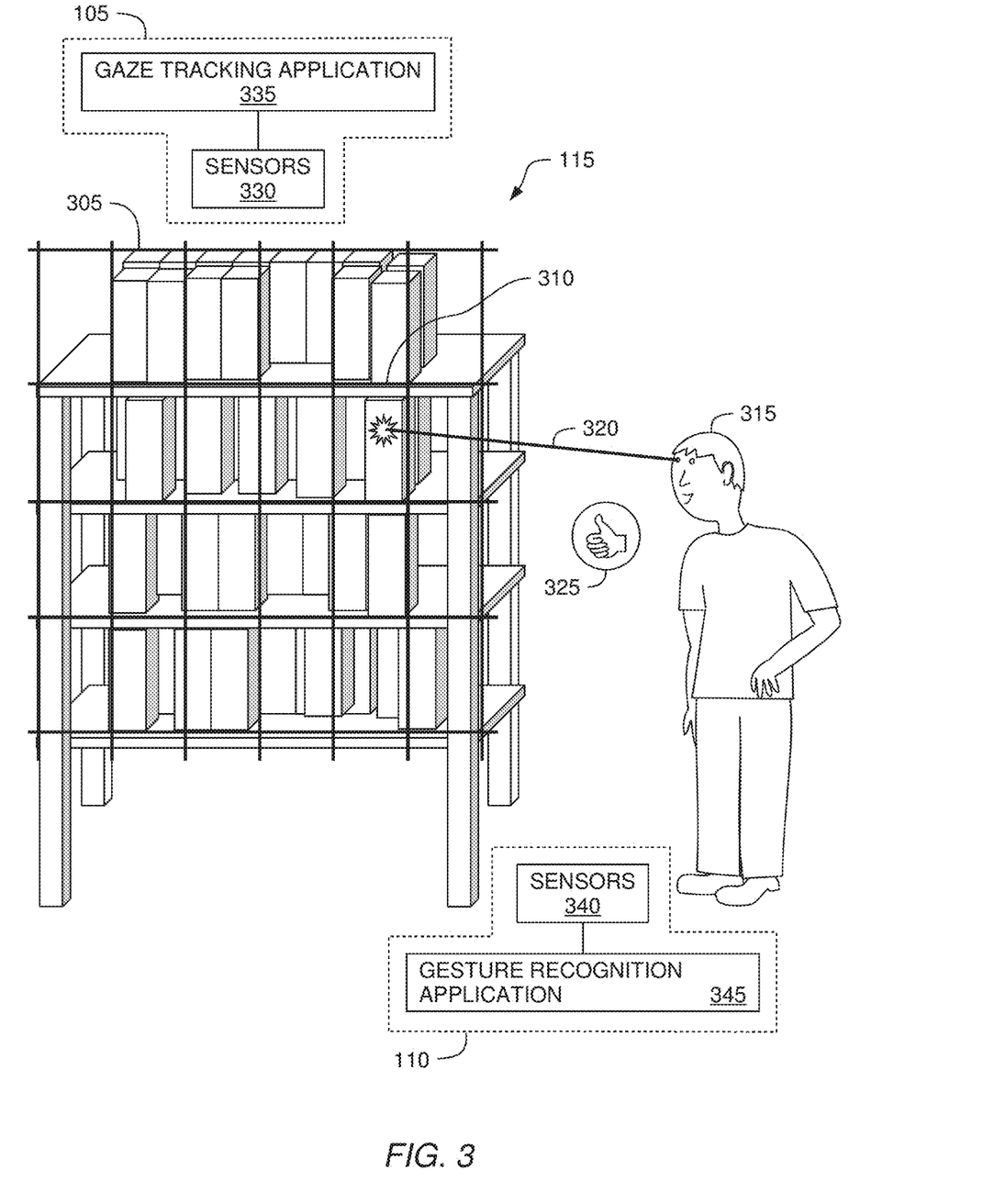
FIG. 3 illustrates a system for using gestures to provide feedback for one or more items, according to one embodiment described herein.

FIG. 3 illustrates a feedback system 300 for using gestures to assign feedback to an item or items, according to one embodiment described herein. Specifically, the feedback system 300 may be used to perform the method 200 in FIG. 2. The feedback system 300 includes an aisle 115 (i.e., a product presentation area) where the locations on the aisle 115 containing different items for sale are divided into a grid 305 with a plurality of cells. In this example, the grid 305 is divided such that items on different selves are divided into different cells using the horizontal grid lines. Vertical grid lines are used to group items on the same self into different cells. In one example, when the shelves are restocked, the stockers may be ensure the same items are placed at the same location on the selves so that the gaze tracking application 335 can correctly correlate each cell with the items in that cell. Nonetheless, if the items are shifted around on the shelves, the gaze tracking application 335 may be updated to know which items are in which cell. When doing so, the size of the cells may change. Even though grid 305 includes cells that have similar dimensions, in some examples, the cells may have different dimensions. For example, if the feedback system is configured to include only one particular item in each cell, the space occupied by the items may differ. For example, the area occupied by a particular type and brand of tissue paper may be smaller than the area occupied by a particular type and brand of toilet paper. Accordingly, the cell for the tissue paper may be smaller than the cell for the toilet paper. Furthermore, the boundary of the cells may be any shape and have any number of sides in order to accommodate the space occupied by the corresponding item or items.

In one embodiment, the gaze tracking system 105 may automatically detect the items on the shelf and correlate the item with the corresponding cell. For example, if a stocker inadvertently replaced on a shelf one brand of toilet paper with a different brand, the gaze tracking system 105 may recognize this switch and correlate any feedback received by a shopper when looking at that cell to the new brand of toilet paper. Similarly, the gaze tracking system 105 may automatically readjust the size of the cells in the grid 305 based on the changing inventory. For example, as shoppers buy the items in a cell, system 105 may shrink the boundaries of the cell. Alternatively, if the items are restocked, system 105 may increase the boundaries of the cell to include all the newly stocked items.

As shown, the gaze tracking system 105 includes sensors 330 and a gaze tracking application 335. The sensors 330 may be located anywhere that permits the sensors 330 to capture images for tracking the gaze of a shopper in the aisle 115—e.g., the sensors 330 may be mounted on the shelves or above the shelves. The sensors 330 transmit the captured images to the gaze tracking application 335 which identifies a cell currently being viewed by a shopper 315. In this example, the gaze 320 of the shopper 315 is directed to cell 310. The gaze tracking system 105 may constantly track the gaze 320 of the shopper 315 or only identify what cell the shopper is looking at when prompted by the gesture recognition system 110.

As shown here, the gesture recognition system 110 includes sensors 340 and gesture recognition application 345. Like the sensors 330 in the gaze tracking system 105, sensors 340 may be mounted on the shelves in the aisle 115. Alternatively or additionally, the sensors 340 may be mounted on the roof on the floor since the image data captured by sensors 340 may not need to track the eyes or face of the shopper 315. The sensors 330 and 340 may be cameras that capture images using visible light, infrared light, or any other electromagnetic radiation. Moreover, in one embodiment, the sensors 330 and 340 may measure depth—i.e., the distance between an object and the sensors.

Using the images captured by sensors 340, the gesture recognition application 345 determines if the shopper 315 is performing a predefined gesture 325. As shown here, the gesture 325 is a thumbs up which indicates the shopper 315 is providing positive feedback for the item or items in cell 310. In response, the feedback system 300 stores the positive feedback in the feedback database.

In one example, instead of using gestures, the feedback system may collect verbal feedback from the shopper. If the shopper 315 likes the item in cell 310, the shopper 315 may say "like it" or "really like it." If the shopper 315 does not like the item, the shopper 315 may say "dislike it" or "hate it." The feedback system may permit the shopper 315 to give feedback using either gestures or spoken language according to his preference. As such, the feedback system may include one more microphones proximate to aisle 115 which listen for predetermined verbal statements from the shopper 315 which indicate when the shopper 315 is providing feedback for the item or items in cell 310.

In addition to detecting feedback that is intentionally being provided by shopper 315, feedback system 300 may also monitor the shopper to detect unintentional feedback. For example, the gaze tracking application 335 may track how long the shopper 315 gazes at a particular cell. If the time exceeds a threshold, the application 335 may mark the cell as being "of interest." Additionally, the gesture recognition application 345 may detect when the shopper 315 picks up an item from the aisle 115 and holds the item. Even if the shopper 315 then puts the item back (instead of purchasing the item), the application 345 may mark this item as being of interest. Thus, when another shopper requests feedback for an item, in addition to providing the intentional feedback to the shopper, the feedback system may also provide the unintentional feedback that states, for example, the percentage of shoppers that visited the aisle 115 whose actions indicated the item was "of interest" to them. Furthermore, the feedback system may provide this information to the manufacture of the item (or its competitors) to determine how the packaging of the item or the placement of the item in the aisle may affect the popularity of the item. For example, the number of times the item is found to be "of interest" may be compared to the number of shoppers who actually purchased the item to see if the item or its packaging should be changed.

Figure 4:
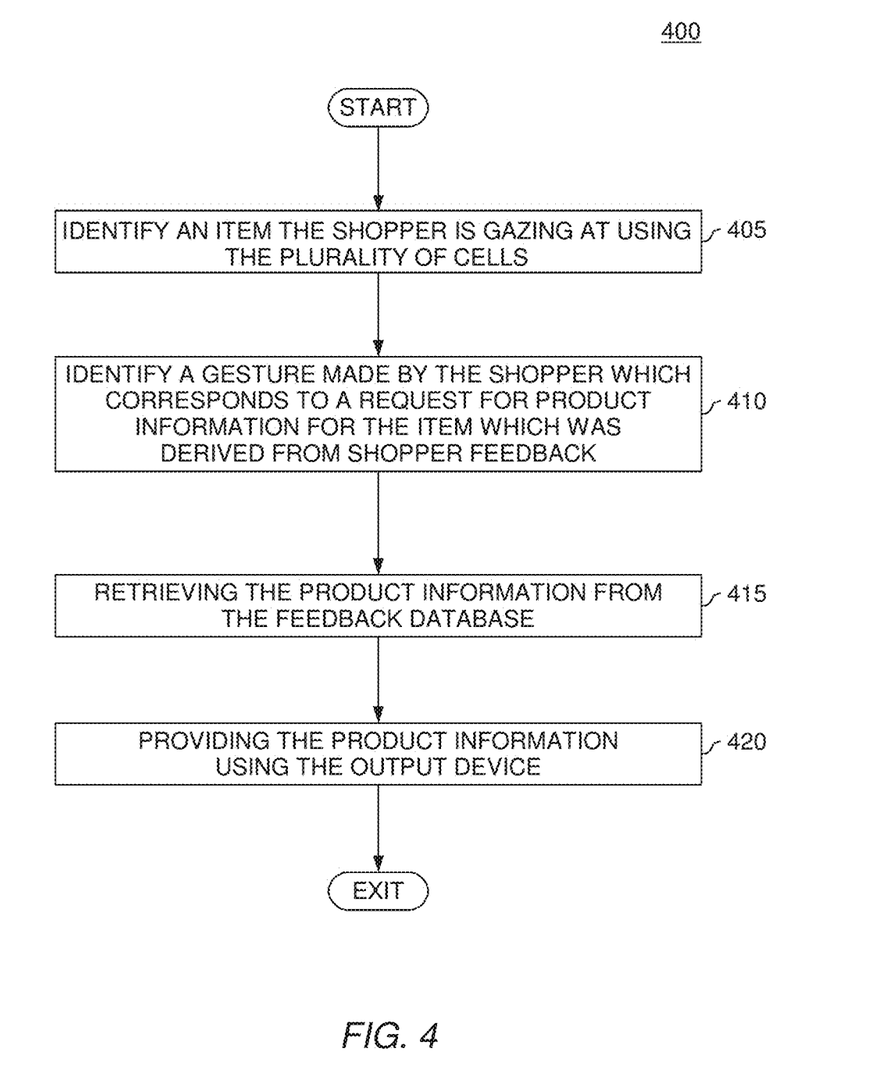
FIG. 4 is a method of using gestures to retrieve shopper feedback for one or more items, according to one embodiment described herein.

FIG. 4 is a method 400 of using gestures to retrieve shopper feedback for an item or items, according to one embodiment described herein. At block 405, the feedback system identifies an item a shopper is gazing at using the plurality of cells and the gaze tracking system. That is, the feedback system identifies a particular cell the shopper is staring at and identifies the item or items in that cell. At block 410, the gesture recognition application determines that the shopper made a predefined gesture indicating that the shopper is requesting product information for the item (or items) in the cell. As used here, "product information" includes the feedback provided by other shoppers which may have been entered using method 200 in FIG. 2 as well as whether the item is on sale, the popularity of the item (e.g., how many units of the item are sold in a day), any trends associated with the items, and the like, which may be derived by other means besides relying on feedback provided by shoppers using method 200.

At block 415, the feedback system retrieves the product information for the item or items from the feedback database. As mentioned above, the feedback database may include feedback from shoppers in other stores which review the same product. Moreover, the feedback database may combine the feedback provided by online shoppers with the feedback provided by in-store shoppers. For example, the company may also sell items over the Internet in addition to the physical store. The website used to sell the items on the Internet may include a review feature for permitting the online shoppers to provide negative or positive feedback. These reviews can then be combined with reviews provided by shoppers at the physical store to provide additional feedback to the shopper.

At block 420, the feedback system outputs the product information on the output device—e.g., a display screen or audio device. In one example, an output device may be mounted on the shelf in the aisle. Depending on the length of the aisle, the feedback system may have several output devices mounted on the shelf at intervals—e.g., every 10 feet. The feedback system may output the product information on the output device that is closest to the cell being gazed at, or on the output device that is closest to the shopper. As mentioned above, the output device may use images, audio, video, or some combination thereof to provide the desired product information to the shopper.

In one example, the feedback system may use the shopper's personal computing device to provide the product information. For example, the shopper may carry a smart phone or tablet which has an application installed that is communicatively coupled to the feedback system. When the shopper indicates she wants the product information, the feedback system transmits this information to the personal computing device where it is displayed to the shopper.

In one example, the feedback system may not use gestures to determine when to output the product information to the shopper. For example, the gaze tracking application may track how long the shopper stares at the cell. If this time exceeds a predetermined threshold, the application assumes the shopper would like the product information and outputs the information on the output device. In another example, the gesture recognition system may determine when the shopper picks up the item. This too may be used to trigger the output of the product information on the output device.

In one example, the feedback system may use the output device to inform the shopper of similar products as the one she is currently viewing or holding. For example, the feedback system may inform the shopper if a similar item has more positive feedback or is on sale.

Figure 5:
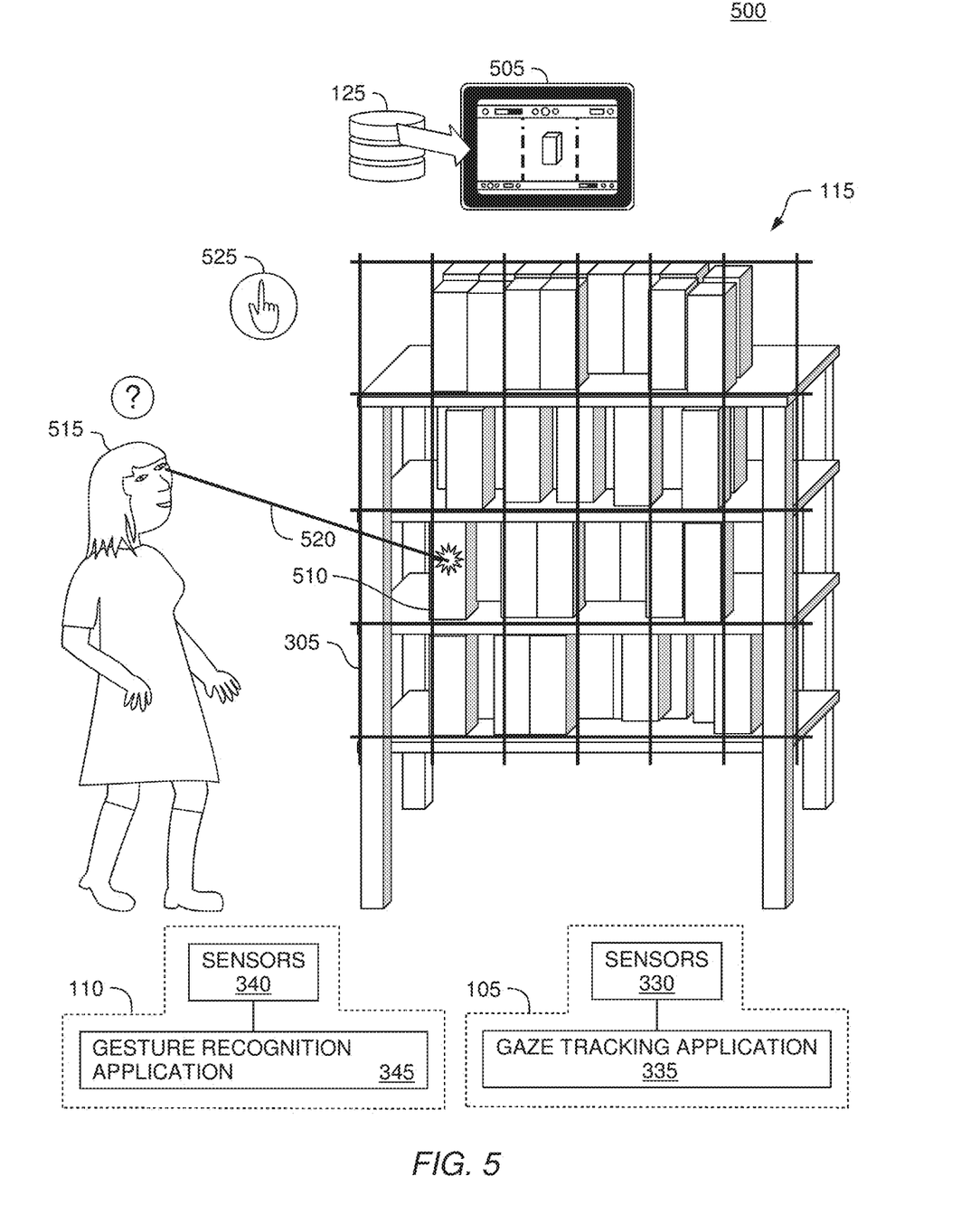
FIG. 5 illustrates a system for using gestures to retrieve shopper feedback for one or more items, according to embodiments described herein.

FIG. 5 illustrates a feedback system 500 for using gestures to retrieve shopper feedback for an item or items, according to embodiments described herein. Specifically, feedback system 500 may be used to perform method 400 illustrated in FIG. 4. As shown, feedback system 500 includes gaze tracking system 105 and gesture recognition system 110 as described above. The system 500 also includes feedback database 125 which is communicatively coupled to display device 505 which may be mounted on or near the aisle 115.

The gaze tracking application 335 tracks the gaze 520 of shopper 515 to determine which of the cells in the grid 305 the shopper 515 is currently viewing. The gesture recognition application 345 tracks the body of the shopper 515 to determine when the shopper performs a predefined gesture 525, shown here as point the index finger vertically. This gesture 525 indicates to the feedback system 500 that the shopper 515 wants the product information corresponding to the items in the cell 510 the shopper 515 is currently gazing at. In response, the feedback system 500 instructs the feedback database 125 to provide the product information corresponding to the item or items in cell 510 to the display device 505. The shopper can then view the product information to aid in his purchase.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    assigning a plurality of items to respective cells of a plurality of cells that divide up an item presentation area in a physical store based on different characteristics of the plurality of items, wherein the plurality of items on different shelves are virtually divided into different cells using horizontal grid lines and items on the same shelf are virtually divided into different groups using vertical grid lines;
    determining, by tracking a gaze of a person viewing the item presentation area, a first cell of the plurality of cells being viewed by the person using images captured by a sensor;
    identifying an item based on determining the person is gazing at the first cell;
    identifying a predefined feedback gesture performed by the person when viewing the first cell;
    assigning a feedback value corresponding to the feedback gesture to the identified item for sale located in the first cell;
    identifying changing inventory of items in the plurality of cells; and
    readjusting a size of one or more cells of the plurality of cells size assigned to one or more corresponding items of the plurality of items based on identifying the changing inventory.

2. The method of claim 1, wherein the item presentation area comprises a rack containing the different shelves, wherein each of the different shelves is contained in a different one of the plurality of cells.

3. The method of claim 1, further comprising:
    receiving audio feedback from the person when viewing the first cell; and
    assigning a different feedback value corresponding to the audio feedback to the items for sale.

4. The method of claim 1, wherein identifying the feedback gesture comprises evaluating image data captured using one or more sensors, wherein the image data includes at least a portion of the person, and wherein the feedback gesture is performed using at least one hand of the person, wherein assigning the feedback value comprises:
    comparing the feedback gesture to a plurality of stored feedback gestures, wherein the plurality of stored feedback gestures represents multiple weights of positive feedback and multiple weights of negative feedback for the identified item the person is currently gazing at; and
    selecting the feedback value corresponding to one of the plurality of stored feedback gestures that matches the feedback gesture performed by the person.

5. The method of claim 1, wherein the feedback value represents an opinion of the person regarding the items for sale, the method further comprising:
    storing the feedback value in a database comprising respective feedback values for the items for sale provided by a plurality of different persons when in the physical store.

6. The method of claim 5, further comprising:
   determining, by tracking a gaze of a second person viewing the item presentation area, that the second person is viewing the first cell;
   identifying a second predefined gesture performed by the second person when viewing the first cell, wherein the second predefined gesture represents a request by the second person for the feedback value stored in the database; and
   retrieving the feedback value from the database.

7. The method of claim 5, wherein the database is available to cross channel media such that the feedback value is accessible using a computing device located outside the physical store.

8. The method of claim 5, wherein the database stores feedback from a plurality of different sources, where at least one of the different sources is the person and an online shopper,
   wherein the feedback from the different sources is categorized and is made available to cross channel media.

9. A computer-readable storage medium storing computer-readable program code which, when executed on a processor, performs an operation, the operation comprising:
   assigning a plurality of items to respective cells of a plurality of cells that divide up an item presentation area in a physical store based on different characteristics of the plurality of items, wherein the plurality of items on different shelves are virtually divided into different cells using horizontal grid lines and items on the same shelf are virtually divided into different groups using vertical grid lines;
   determining, by tracking a gaze of a person viewing the item presentation area, a first cell of the plurality of cells being viewed by the person using images captured by a sensor;
   identifying an item based on determining the person is gazing at the first cell;
   identifying a predefined feedback gesture performed by the person when viewing the first cell;
   assigning a feedback value corresponding to the feedback gesture to one or more items for sale located in the first cell;
   identifying changing inventory of items in the plurality of cells; and
   readjusting a size of one or more cells of the plurality of cells size assigned to one or more corresponding items of the plurality of items based on identifying the changing inventory.

10. The computer-readable storage medium claim 9, wherein the item presentation area comprises a rack containing the different shelves, wherein each of the different shelves is contained in a different one of the plurality of cells.

11. The computer-readable storage medium of claim 9, the operation further comprising:
   receiving audio feedback from the person when viewing the first cell; and
   assigning a different feedback value corresponding to the audio feedback to the items for sale.

12. The computer-readable storage medium of claim 9, wherein identifying the feedback gesture comprises evaluating image data captured using one or more sensors, wherein the image data includes at least a portion of the person, and wherein the feedback gesture is performed using at least one hand of the person.

13. The computer-readable storage medium of claim 9, wherein the feedback value represents an opinion of the person regarding the items for sale, the operation further comprising:
   storing the feedback value in a database comprising respective feedback values for the items for sale provided by a plurality of different persons when in the physical store.

14. The computer-readable storage medium of claim 13, the operation further comprising:
   determining, by tracking a gaze of a second person viewing the item presentation area, that the second person is viewing the first cell;
   identifying a second predefined gesture performed by the second person when viewing the first cell, wherein the second predefined gesture represents a request by the second person for the feedback value stored in the database; and
   retrieving the feedback value from the database.

15. A system, comprising:
   an image sensor configured to output image data capturing a person viewing an item presentation area;
   a gaze tracking module configured to:
      assign a plurality of items to respective cells of a plurality of cells that divide up the item presentation area based on different characteristics of the plurality of items, wherein the plurality of items on different shelves are virtually divided into different cells using horizontal grid lines and items on the same shelf are virtually divided into different groups using vertical grid lines;
      determine, by tracking a gaze of the person viewing the item presentation area in a physical store using the image data, a first cell of the plurality of cells being viewed by the person,
      identify an item based on determining the person is gazing at the first cell,
      identifying changing inventory of items in the plurality of cells, and
      readjusting a size of one or more cells of the plurality of cells size assigned to one or more corresponding items of the plurality of items based on identifying the changing inventory; and
   a gesture recognition module configured to:
      identify a predefined feedback gesture performed by the person when viewing the first cell, and
      assign a feedback value corresponding to the feedback gesture to one or more items for sale located in the first cell.

16. The system of claim 15, wherein the item presentation area comprises a rack containing the different shelves, and wherein the image sensor is mounted onto the rack.

17. The system of claim 15, further comprising:
   a database configured to store respective feedback values for the items for sale provided by a plurality of different persons when in the physical store, wherein the respective feedback values represent opinions of the plurality of different persons regarding the items for sale.

18. The system of claim 17, wherein the gaze tracking module is configured to determine, by tracking a gaze of a second person viewing the item presentation area, that the second person is viewing the first cell, wherein the gesture recognition module is configured to:
   identify a second predefined gesture performed by the second person when viewing the first cell, wherein the second predefined gesture represents a request by the second person for the feedback value stored in the database; and retrieve the feedback value from the database.

19. The system of claim 18, further comprising:

an output device configured to output the feedback value to the second person using at least one of audio or visual devices.

20. The system of claim 15, further comprising:

a gesture sensor configured to output image data including at least one hand of the person, wherein the image data outputted by the gesture sensor provides a different vantage point of the person than the image data outputted by the image sensor.

* * * * *

UNITED STATES PATENT AND TRADEMARK OFFICE
CERTIFICATE OF CORRECTION

PATENT NO. : 11,107,091 B2  
APPLICATION NO. : 14/675053  
DATED : August 31, 2021  
INVENTOR(S) : Kavita Prasad et al.

Page 1 of 1

It is certified that error appears in the above-identified patent and that said Letters Patent is hereby corrected as shown below:

In the Claims

In Column 12, Line 35, in Claim 1, after "cells" delete "sizc".

In Column 13, Line 48, in Claim 9, after "cells" delete "size".

In Column 13, Line 51, in Claim 10, after "medium" insert -- of --.

In Column 14, Line 43, in Claim 15, after "cells" delete "size".

Signed and Sealed this  
Fourth Day of July, 2023

Katherine Kelly Vidal  
*Director of the United States Patent and Trademark Office*